(12) United States Patent
Fradet

(10) Patent No.: US 7,997,536 B2
(45) Date of Patent: Aug. 16, 2011

(54) EQUIPMENT FOR A JUMP IN AN OVERSIZED PARACHUTE

(76) Inventor: Eric Fradet, Tallard (FR)

( * ) Notice: Subject to any disclaimer, the term of this patent is extended or adjusted under 35 U.S.C. 154(b) by 665 days.

(21) Appl. No.: 12/150,514

(22) Filed: Apr. 28, 2008

(65) Prior Publication Data
US 2008/0272238 A1    Nov. 6, 2008

(30) Foreign Application Priority Data

May 2, 2007   (FR) ...................... 07 54819

(51) Int. Cl.
*B64D 17/30*   (2006.01)
(52) U.S. Cl. .................................. 244/151 R
(58) Field of Classification Search .......... 224/157; 244/151
See application file for complete search history.

(56) References Cited

U.S. PATENT DOCUMENTS

| 620,694 | A | * | 3/1899 | Chadwick | ................ 244/151 R |
| 3,088,700 | A | | 5/1963 | Carrey | |
| 4,746,084 | A | | 5/1988 | Strong | |
| 2006/0254533 | A1 | | 11/2006 | Fuller et al. | |

OTHER PUBLICATIONS

Jan Meyer, "Can you fall out of a properly fastened Harness?", 2004 http://www.makeithappen.com/spsj/fallout.html.*

* cited by examiner

*Primary Examiner* — Galen Barefoot
(74) *Attorney, Agent, or Firm* — Collard & Roe, P.C.

(57) ABSTRACT

The present invention relates to an equipment for jump in an oversized parachute for carrying a pilot (1) and a passenger (2) comprising a main harness (3) and a secondary harness (4) connected to the main harness (3) and provided with at least a dorsal part and a frontal part which can be applied on the back and the belly of the passenger (2), respectively, characterized in that it comprises means to maintain the dorsal part and the frontal part of the secondary harness (4) spaced apart. The invention has the advantage of enabling a better positioning of the passenger (2) during the canopy descent in view of the landing operations. The invention will find its application during jumps in tandem parachute.

17 Claims, 7 Drawing Sheets

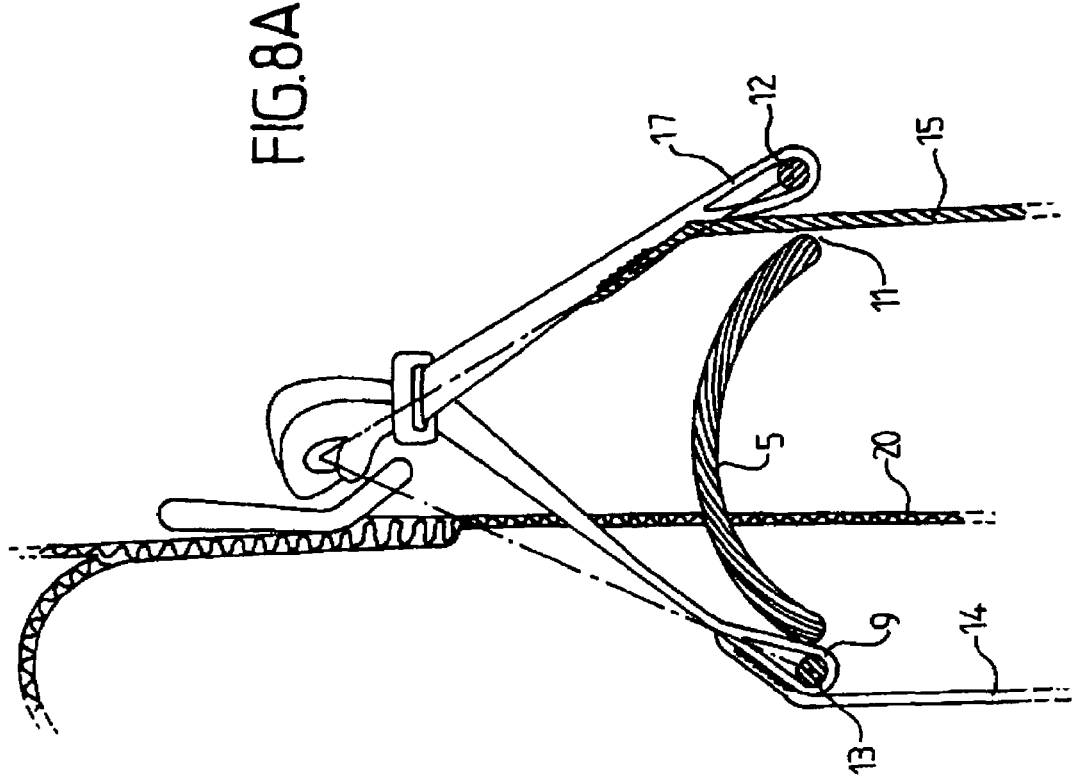
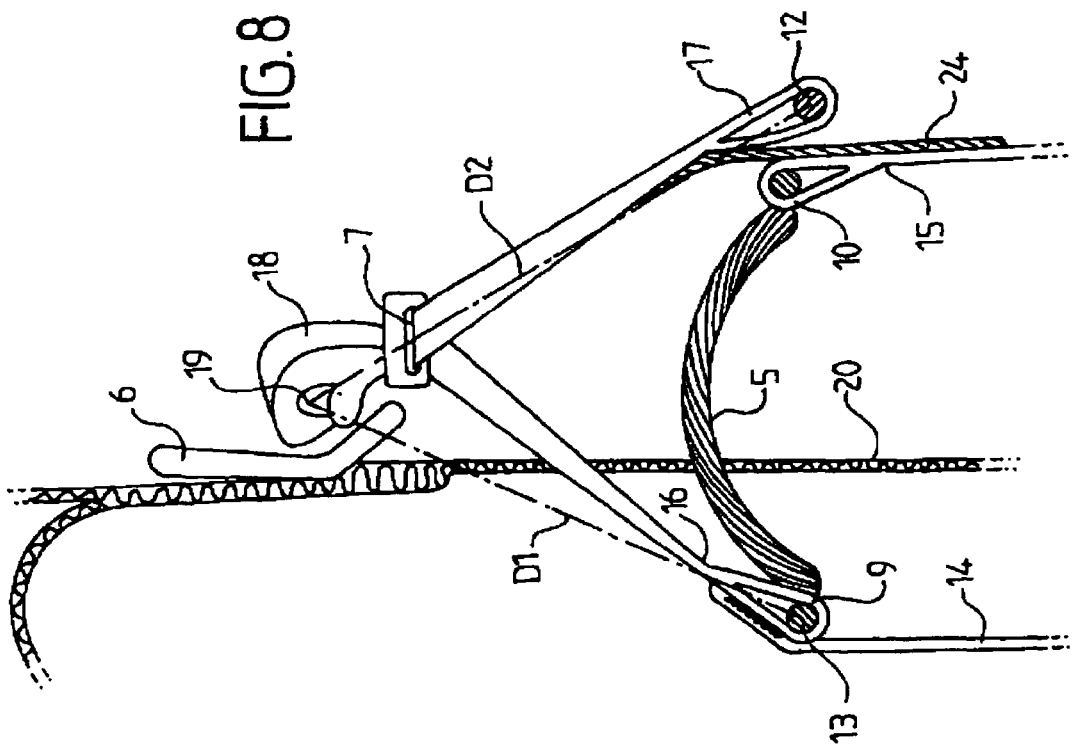

EQUIPMENT FOR A JUMP IN AN OVERSIZED PARACHUTE

CROSS-REFERENCE TO RELATED APPLICATIONS

Applicant claims priority under 35 U.S.C. 119 of French patent application No. 0754819 filed on 2 May 2007.

BACKGROUND OF THE INVENTION

The present invention relates to an equipment for parachute jumps in an oversized parachute.

A particular application of the invention is for tandem jumps, i.e. when the parachutist brings, under the same parachute, a person or an additional front load.

For such jumps, oversized parachutes are used, for carrying, in addition to the parachutist himself, a passenger—hence their name of "tandem parachute"—or an additional front load. Theses parachutes are of the ram air with cells type, featuring a cellular structure forming a floating canopy. In the present disclosure, all kinds of canopies such as paragliders, sailwings or parachutes are referred to as "parachute". The parachutist who brings with him another person or an additional front load is called a "pilot", and the person brought a "passenger".

Unless otherwise indicated, the explanations given with reference to a passenger are also valid, similarly if applicable, with reference to an additional load.

Document U.S. Pat. No. 4,746,084 describes an equipment for tandem parachute jump, comprising a parachute harness for the passenger and a parachute harness for the pilot, the passenger's harness being connected to the pilot's harness by snaps located at shoulders and waist.

According to the currently used technique, the passenger is hung by a retaining device consisting of flexible straps, whose anchoring point connects to the pilot's harness, which supports it. This anchoring point can be located in front or at the back of the shoulder line.

The prior art equipments have several disadvantages.

With such a device, the passenger carried either rests against the pilot during the whole canopy descent, or is uncomfortably hung from the back.

The main disadvantage resulting from this type of piloting, namely during longstanding flights, is that the passenger and/or the pilot undergo a severe lack of comfort and cannot find an appropriate position during the landing.

The passenger is constantly either pushed forward by the pilot's body, with the inconvenient of exercising a pressure on the thoracic cage of the pilot, or pressed in the straps of the legstraps due to the fact that he is hung by the back.

This pressing results in a physical and psychic fatigue that gradually lowers the reflexes.

Because of the current arrangement of the straps during the landing, the passenger can be, during the landing, either in a very low position with respect to the pilot, where it is difficult for the pilot to hit the ground first, or the passenger is forced to perform an important muscular contraction to pull up his legs during the landing operation, which is a physical effort that all passengers are not able to provide.

When the passenger has not pulled up his legs high enough, the consequences can be serious, since they relate to the pelvis as well as to the vertebral column, not to mention that it also puts the pilot in a difficult situation.

BRIEF SUMMARY OF THE INVENTION

An object of the present invention is to mitigate all or part of the disadvantages of the prior art.

An object of the present invention is to create an equipment with means that enable the passenger, during the canopy descent, to take a better adapted position for the landing operations.

The present invention provides an equipment for a jump in an oversized parachute, intended to carry a pilot and a passenger, including a main harness and a secondary harness connected to the main harness and provided with at least a dorsal part and a frontal part which can be applied respectively on the back and on the belly of the passenger, characterized in that it includes means to maintain the dorsal part and the frontal part of the secondary harness spaced apart.

The spacing between the frontal part and the dorsal part of the secondary harness gives more freedom of motion to the passenger, since he is no more compressed between both parts of his harness.

Moreover, with this spacing, the pulling effort provided by the main canopy is equally transmitted on the frontal and dorsal parts of the secondary harness, and no more only on either the frontal part, or the dorsal part, as it is the case in the prior art devices.

This arrangement according to the invention enables the passenger to be in a more seated position while being raised, thus more comfortable and more secure.

Insofar as the passenger is now in a semi-seated position, his efforts to raise his legs during the landing are greatly reduced.

The means to maintain the parts of the secondary harness spaced apart are advantageously a rigid spacer element extending transversally between the dorsal part and the frontal part of the secondary harness.

No compression effort directly exerts on a part of the passenger's or pilot's body since the rigid shape and the length of the spacer element also contribute to the spacing of both bodies with respect to each other.

According to a preferred embodiment, the spacer element is substantially rectangular and has a concave lower face. This shape enables the spacer element to be adaptable at each passenger's harness shoulder. This location is advantageous for the equipment according to the invention.

According to this embodiment, the secondary harness advantageously consists of two spacer elements. In the following description, the use of the term "spacer element" is meant to refer to both spacer elements.

The spacer element is substantially rectangular and advantageously provided, at both dorsal and frontal ends, with slots able to cooperate with the frontal and the dorsal parts of the secondary harness.

The spacer element can also have a bonding role between the secondary harness and the main harness. The spacer element is spacing apart and can connect the dorsal part and the frontal part of the secondary harness. The secondary harness also has to be attached to the main harness. Thus the spacer element cooperates in two distinct areas with at least one limiting frontal strap and at least one limiting dorsal strap joining together in a single contact point from which is fixed the snap means for a connection of the secondary harness to the main harness.

According to an advantageous embodiment, the distance between the end of limiting dorsal strap and the attachment point on the main harness is equal to the distance between the end of limiting frontal strap and this attachment point. This arrangement contributes to a good repartition of tensile forces between the dorsal and frontal parts of the secondary harness, since the spacer element finds his balance by itself, whatever the passenger's weight.

Other objectives and advantages will become apparent from the following description of a preferred embodiment of the invention, which is not intended to be limiting.

According to preferred, but not limiting, alternatives, the equipment according to the invention is such that:
- the means to maintain a spacing comprise a rigid spacer element extending transversally between the dorsal part and the frontal part of the secondary harness;
- the spacer element is substantially rectangular and provided with at least a slot at each of the dorsal and frontal ends;
- the spacer element is provided at its frontal end with an outer frontal slot and an inner frontal slot disposed side by side;
- the inner frontal slot is for a cooperation with the frontal part;
- the spacer element cooperates in two distinct areas with at least one limitating frontal strap and at least one limitating dorsal strap joining together in a single contact point intended to connect the secondary harness with the main harness;
- the outer frontal slot is for a cooperation with the limitating frontal strap;
- the spacer element is provided at its dorsal end with a dorsal slot for a cooperation with the limitating dorsal strap;
- the dorsal part is fixed to the limitating dorsal strap;
- the spacer element is built-up so that the distance between the dorsal end and an attachment point of the secondary harness on the main harness is substantially equal to the distance between the frontal end and said attachment point;
- the spacer element has a concave lower face;
- the spacer element is made of a material with a rigid core of variable length.

BRIEF DESCRIPTION OF THE SEVERAL VIEWS OF THE DRAWING

The accompanying drawings are given as only exemplary and are not intended to be a limitation of the invention. They only represent one embodiment of the invention and will allow its easy understanding.

On the drawings:

FIGS. 8 and 8A are detailed side views of the equipment according to the invention;

DETAILED DESCRIPTION OF THE INVENTION

Figure 1:
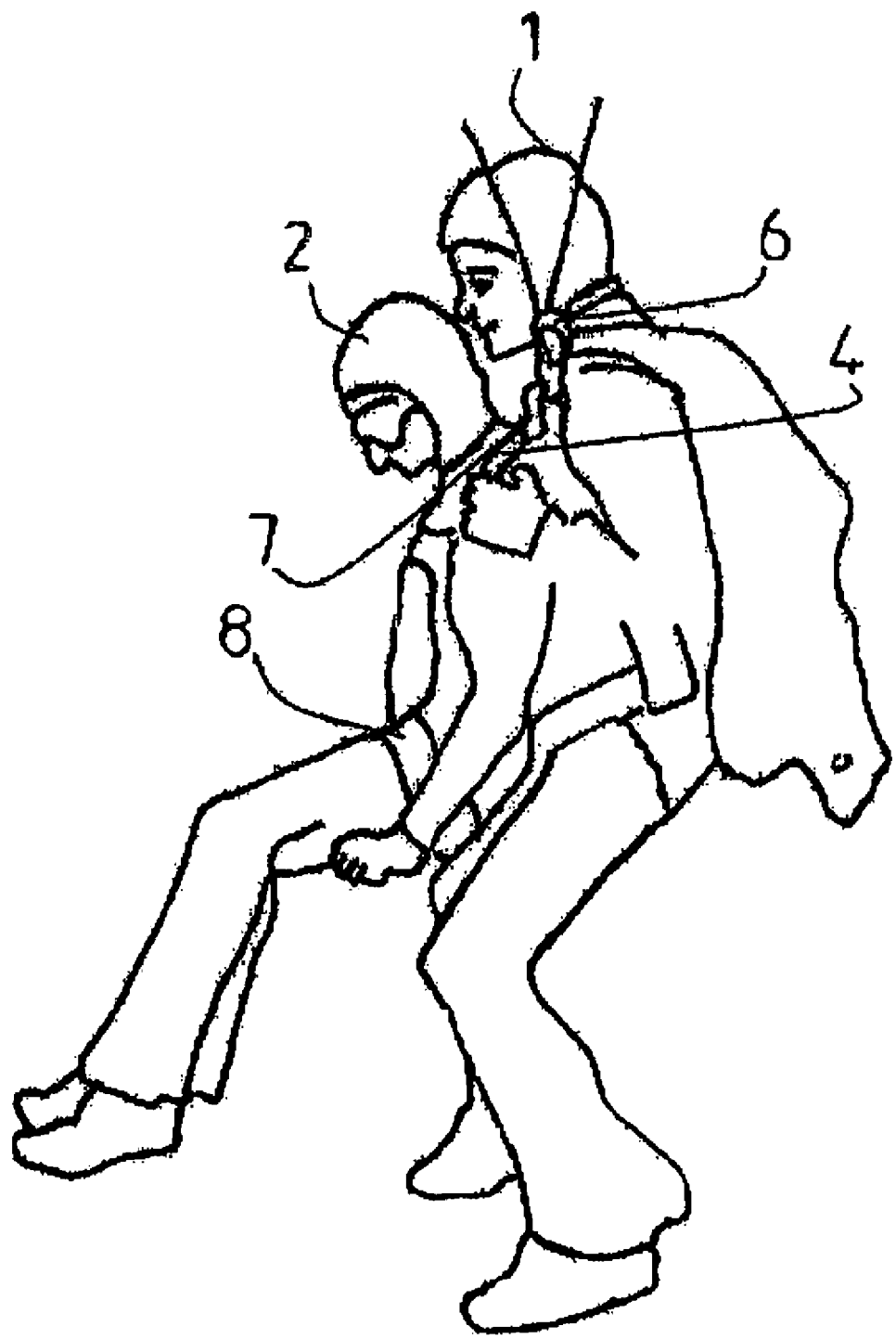
FIG. 1 is a side view of a tandem under a canopy equipped with an equipment according to the prior art.
Figure 2:
FIG. 2 is a front view of a tandem in free fall equipped with an equipment according to the invention.

The pilot 1 is carried by a main harness 3 and the passenger 2 is hung by a secondary harness 4 consisting of a frontal part and a dorsal part.

The dorsal part can be applied on the back of the passenger 2 whereas the frontal part can be applied on the belly of the passenger 2.

According to a preferred embodiment, the frontal part of the secondary harness 4 consists of at least two parallel frontal straps 15, which can be longitudinally applied on the belly of the passenger 2.

The dorsal part also comprises at least two dorsal straps 14, which can be applied on the back of the passenger 2.

The main harness 3 and the secondary harness 4 are connected with each other by a snap 18 provided on the secondary harness 4, which snap is fixing to a ring 6 provided on the main harness 3 and for an accommodation of the fasteners of the secondary harness 4.

The anchorage of the snap 18 is conventionally done at the ring 6 positioned such that, as commonly known, the pilot 1 ensures the anchorage of the secondary harness 4 of the passenger 2.

The dorsal part and the frontal part of the secondary harness 4 are maintained spaced apart by means to maintain a spacing.

Advantageously, these means are a rigid spacer element 5, arranged transversally between both parts.

The passenger 2 has the dorsal and frontal parts spaced apart by the spacer element 5 and thus equally biased by the front and the back due to the tensile action associated with the support of the spacer element 5.

The spacer element 5 shown consists of a single rigid and resistant elongated piece to ensure the spacing of the dorsal and frontal parts of the secondary harness 4.

Thus, the passenger 2 has his chest physically spaced apart by the length of this rigid spacer element 5 which however keeps a certain flexibility in order to follow the torsion and twisting movements of the chest of the passenger 2 around its vertical axis during operations, such as moving in turns of the pilot 1-passenger 2 assembly.

The curvature of the inner face and the length of the spacer element 5 are sufficient to substantially match the curvature and the width of the shoulders of the passenger 2.

According to this preferred design, the equipment according to the invention comprises two spacer elements 5. For more clarity in the description, the term spacer element 5 is used with the singular, but the description applies to both spacer elements 5.

The spacer element 5 is provided, at its frontal 12 and dorsal 13 ends, with slots enabling its attachment to the different parts of the secondary harness 4.

The slots give a guiding space for the frontal 15 and dorsal 14 straps of the secondary harness 4, on the whole width in order for them not to slip laterally.

The arrangement of the frontal 15 and dorsal 14 straps with the spacer element 5 limits the angular movement of the spacer element 5 upwards.

The spacer element 5 shown is of a substantially rectangular shape.

The slots of the spacer element 5 are substantially disposed on the same plane, another slot can be added to the dorsal part of the spacer element 5 to enable a different arrangement of the dorsal 14 and limitating dorsal 16 straps.

Figure 3:
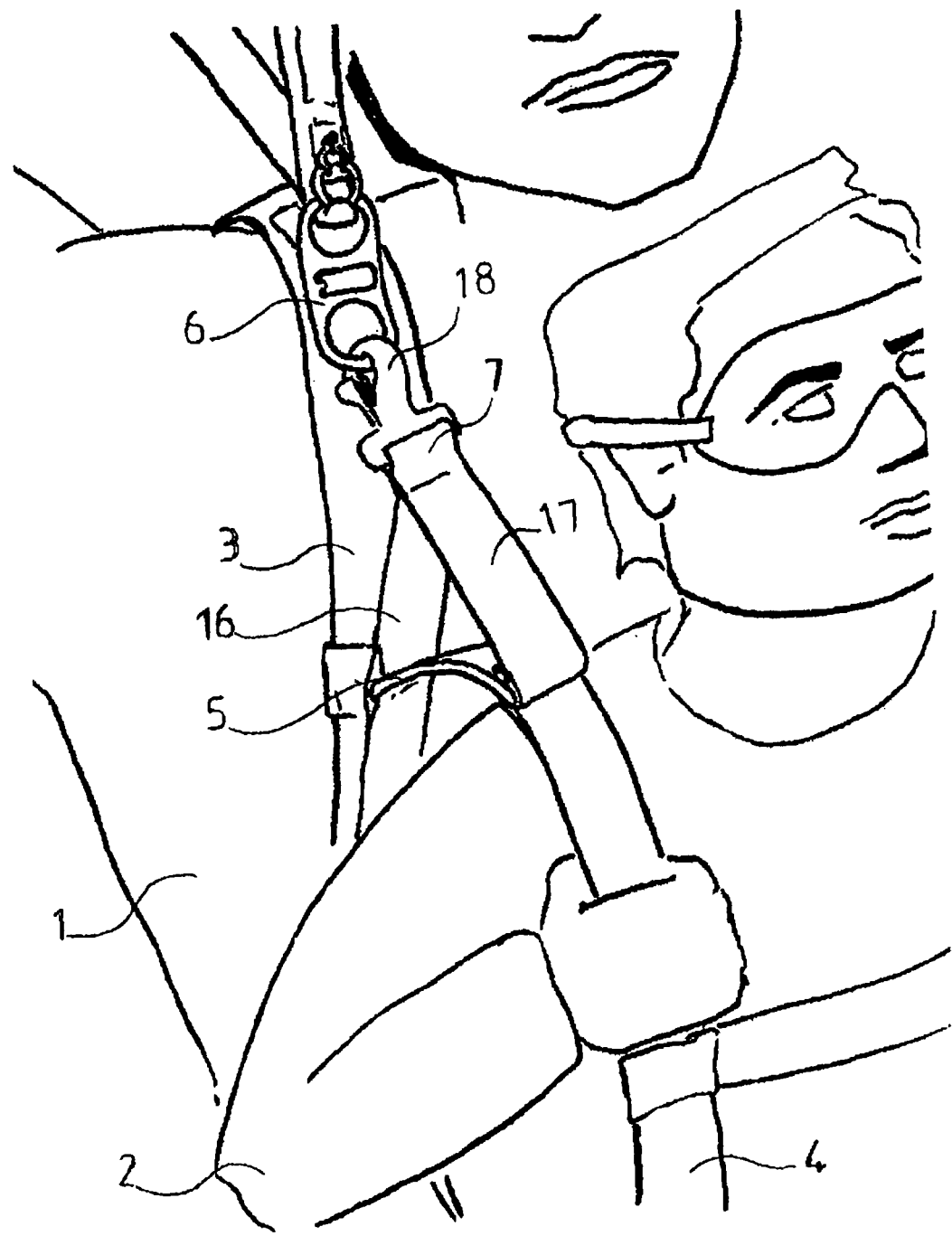
FIG. 3 is a front view of a tandem under canopy equipped with an equipment according to the invention.
Figure 4:
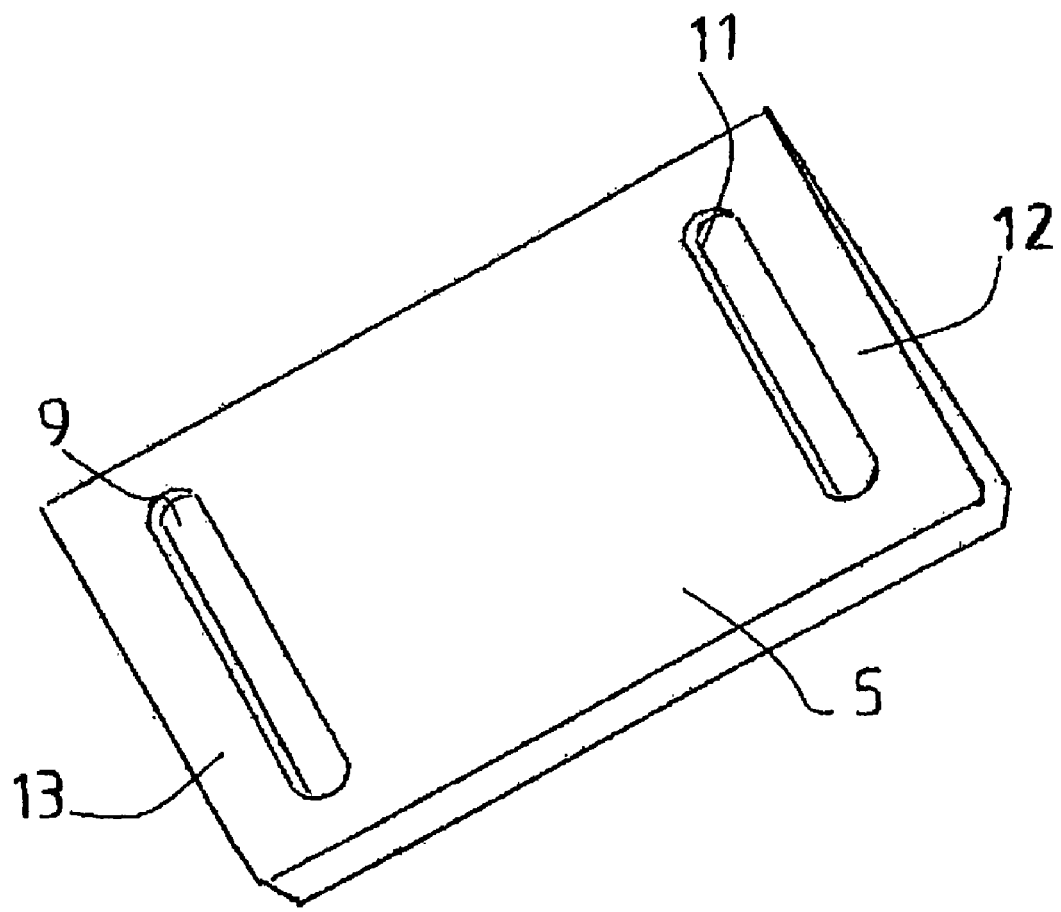
FIG. 4 is a schematic view of the spacer element according to an embodiment of the invention.
Figures 5, 6:
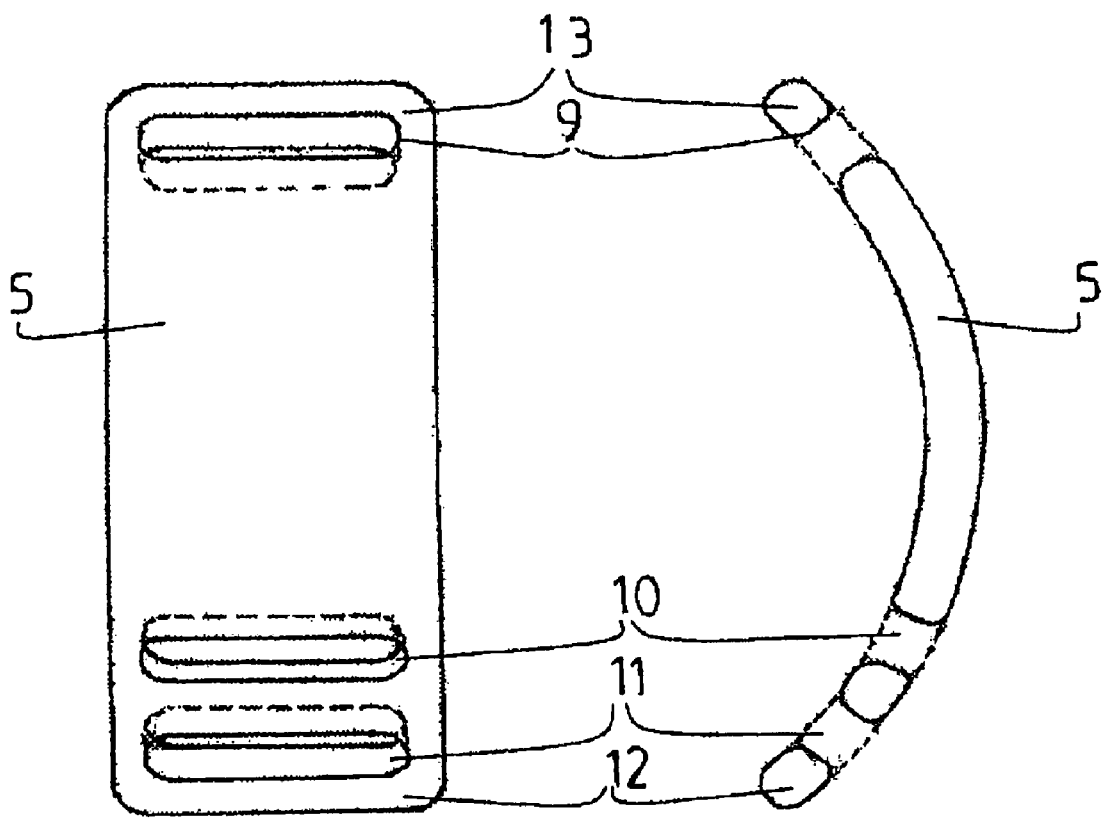
FIG. 5 is a top view of the spacer element according to another embodiment of the invention.
FIG. 6 is a side view of the spacer element according to FIG. 5.
Figure 7:
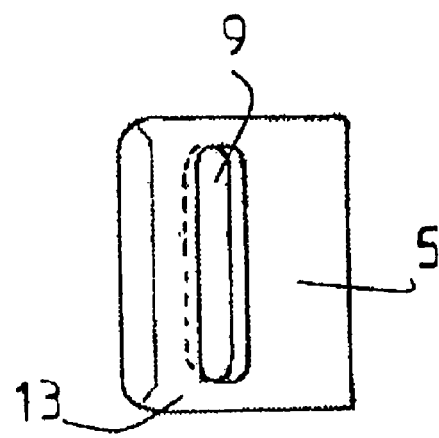
FIG. 7 is a side view of the spacer element according to FIG. 5.
Figure 9:
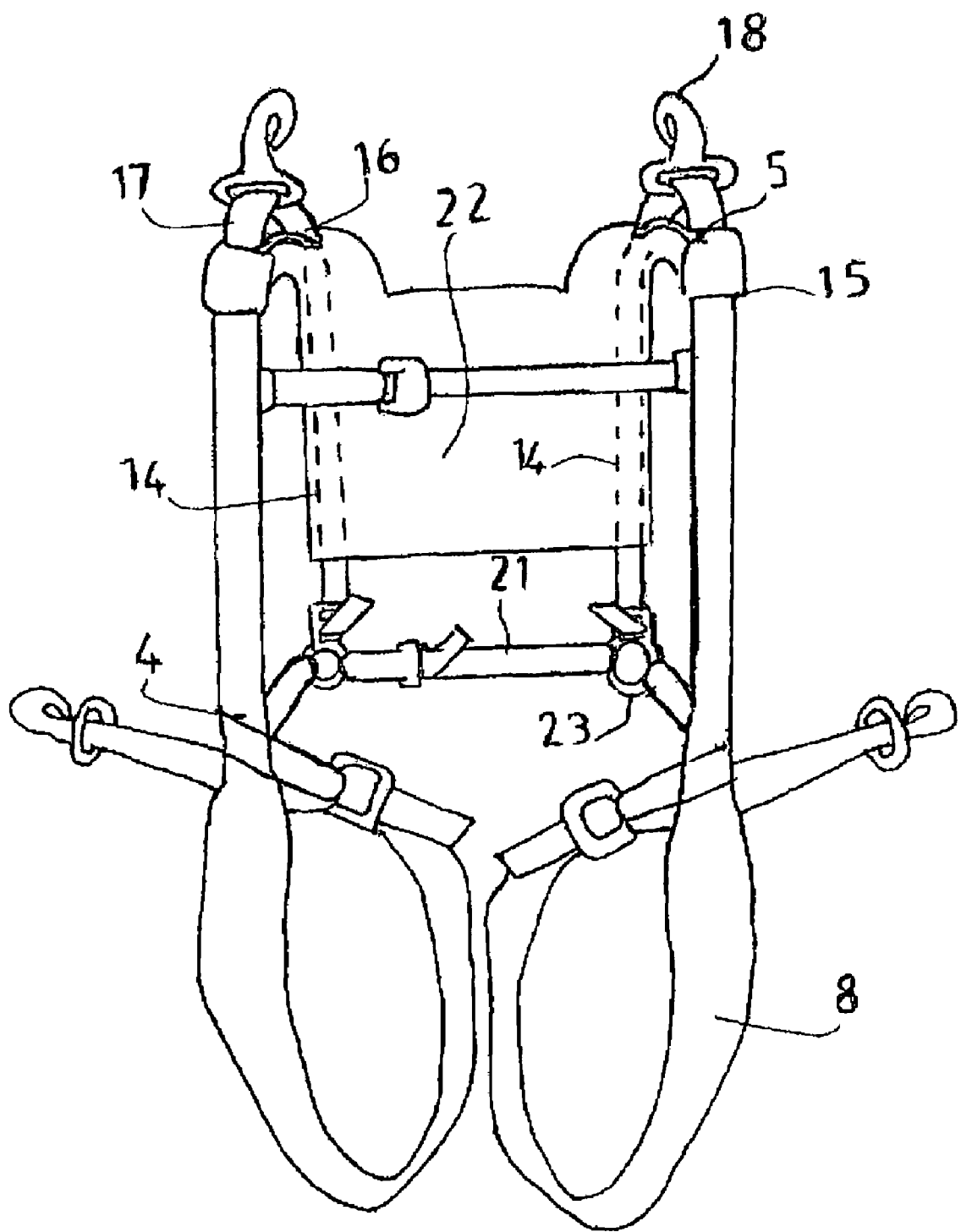
FIG. 9 is a front view of the secondary harness according to the invention.

The spacer element 5 can comprise only two slots at each of its ends, a dorsal slot 9 and a frontal slot 11, as shown in FIG. 3.

The passage of the frontal 15 and dorsal 14 straps is then arranged to enable them to allow several strap passes in order to act like as a limitating strap.

According to another preferred embodiment, the spacer element 5 is provided at its dorsal end 13 with a dorsal slot 9 for the passage of a limitating dorsal slot 16 and at its frontal end 12 with two slots disposed side by side: an inner frontal slot 10 for a cooperation with the frontal strap 15 of the secondary harness 4, an outer frontal slot 11 for the passage of the limitating frontal strap 17 of the secondary harness 4.

This design is more advantageous, as it contributes to a better distribution of the tensile forces of the main canopy on the frontal and dorsal parts of the secondary harness 4.

The spacer element 5 is fixed such that the attaching arrangement with the limitating straps 16 and 17 draws a triangle with the triangle vertex 19 being fixed at the snap 18 that hooks to the main harness 3 at the ring 6.

The length of the limitating straps 16 and 17 is calculated such that the distances D1 and D2 between the triangle vertex 19 and the contact with the spacer element 5 represented by the frontal 12 and dorsal 13 ends are substantially the same.

Consequently, the length of the limitating dorsal strap 16 between the single contact point 7 and the dorsal end 13 differs from the length of the limitating frontal strap 17 between the single contact point 7 and the frontal end 12.

This arrangement is selected such that after hooking to the main harness 3, the spacer element 5, in the disposition under canopy, lies horizontally in order to fulfil its spacer element and support function in the middle.

One can notice that, under the effect of triangulation, the dorsal end 3 is under canopy in retreat from the frontal part 20 of the main harness 3. This design is being made possible by the fact that the main harness 3 accepts to back away under the tension of the spacer element 5, because the space in the harness has been released after the main parachute opening.

The spacer element 5 is definitely fixed by one end to the limitating dorsal strap 16 of the secondary harness 4 and by another end to the limitating frontal strap 17 and to the frontal part of the secondary harness 4.

The spacer element 5 is preferably maintained attached by sewing made on the straps.

Advantageously, the limitating frontal strap 17 of the secondary harness 4 makes a loop which passes in the outer frontal slot 11 of the spacer element 5, the frontal part makes a loop which passes in the inner 10 and outer 11 frontal slots whereas the limitating dorsal strap 16 makes a loop which passes in the dorsal slot 9.

The limitating dorsal strap 16 is integrally formed with a dorsal strap 14, shown in dotted line, which extends, as known in the prior art, into a backpad 22 of the dorsal part of the secondary harness 4.

By another characteristic of the invention, the secondary harness 4 does not have the dorsal straps 14 crossed in the backpad 22 in order to avoid the spacer element 5 to be wrongly biased, which would tend to put into contact the support base of the spacer element 5 with the chest of the pilot 1 and the spacer element 5 would not operate in the axis.

The dorsal straps 14 are advantageously disposed in parallel in the backpad 22 and fixed to this wall, these dorsal straps 14 are connected with each other, at their base by a lumbar connection strap 21 disposed under the backpad 22 to prevent the swing of passenger 2 by the back. Preferably, an adjustable hinge ring 23 is selected as a connection means between straps 14, 21 and 8. The space fitted between the backpad 22 bottom and the lumbar strap 21 enables the height adjustment of the harness.

This U-shaped arrangement of the dorsal straps 14 enables not to bias the anchorage of the spacer elements 5, as would be the case with crossed dorsal straps 14.

This holding element 5 can be disposed during production or even by addition on already existing secondary harnesses 4.

The limitating frontal strap 17 and the strap 15 can be connected to each other by a strap 24 being used as a link, as shown in FIG. 8. The top end of the strap 24 is connected, for example by sewing, to the strap 17 and its lower end is connected, also by sewing, to the strap 15. This strap 24 ensures more security.

The limitating frontal strap 17 and the frontal strap 15 could be made separately without any link with each other, with added loops, linked by sewing after their passage in their respective slots 12 for the strap 17 and 10 for the strap 15.

REFERENCES

1. Main person "pilot"
2. Secondary person "passenger"
3. Main harness
4. Secondary harness
5. Spacer element
6. Ring
7. Single contact point
8. Legstrap
9. Dorsal slot
10. Inner frontal slot
11. Outer frontal slot
12. Frontal end
13. Dorsal end
14. Dorsal strap
15. Frontal strap
16. Limitating dorsal strap
17. Limitating frontal strap
18. Snap
19. Triangle vertex
20. Frontal part of the main harness
21. Bonding strap
22. Backrest
23. Hinging ring
24. Main strap

The invention claimed is:

1. Equipment for a jump in an oversized parachute for carrying a pilot (1) and a passenger (2), comprising a main harness (3) and a secondary harness (4) connected to the main harness (3) and provided with at least a dorsal part and a frontal part, which can be applied on the back and the belly of the passenger (2), respectively, characterized in that it comprises means to maintain the dorsal part and the frontal part of the secondary harness (4) spaced apart, wherein means to maintain the spacing comprise a rigid spacer element (5) extending transversally between the dorsal part and the frontal part of the secondary harness (4).

2. Equipment according to claim 1, wherein the spacer element consists of a material with a rigid core of variable length.

3. Equipment according to claim 1, wherein the spacer element (5) is substantially rectangular and provided with a slot at each of the dorsal (13) and frontal (12) ends.

4. Equipment according to claim 1, wherein the spacer element (5) is provided at its frontal end (12) with an outer frontal slot (11) and an inner frontal slot (10) disposed side by side.

5. Equipment according to claim 4 wherein the inner frontal slot (10) is for a cooperation with the frontal part.

6. Equipment according to claim 1, wherein the spacer element (5) cooperates in two distinct areas with at least one limitative frontal strap (17) and at least one limitative dorsal strap (16) joining together in a single contact point (7) from which is fixed snap means for a connection of the secondary harness (4) to the main harness (3).

7. Equipment according to claim 3, wherein the spacer element (5) cooperates in two distinct areas with at least one limitative frontal strap (17) and at least one limitative dorsal strap (16) joining together in a single contact point (7) from which is fixed snap means for a connection of the secondary harness (4) to the main harness (3).

8. Equipment according to claim 4, wherein the spacer element (5) cooperates in two distinct areas with at least one limitative frontal strap (17) and at least one limitative dorsal strap (16) joining together in a single contact point (7) from which is fixed snap means for a connection of the secondary harness (4) to the main harness (3).

9. Equipment according to claim 6, wherein the outer frontal slot (11) is for a cooperation with the limitative frontal strap (17).

10. Equipment according to claim 7, wherein the outer frontal slot (11) is for a cooperation with the limitative frontal strap (17).

11. Equipment according to claim 8, wherein the outer frontal slot (11) is for a cooperation with the limitative frontal strap (17).

12. Equipment according to claim 6, wherein the spacer element (5) is provided at its dorsal end (13) with a dorsal slot (9) for a cooperation with the limitative dorsal strap (16).

13. Equipment according to claim 7, wherein the spacer element (5) is provided at its dorsal end (13) with a dorsal slot (9) for a cooperation with the limitative dorsal strap (16).

14. Equipment according to claim 8, wherein the spacer element (5) is provided at its dorsal end (13) with a dorsal slot (9) for a cooperation with the limitative dorsal strap (16).

15. Equipment according to claim 12, wherein the dorsal part is fixed to the limitative dorsal strap (16).

16. Equipment according to claim 3, wherein the spacer element (5) is arranged so that the distance D1 between the dorsal end (13) and an attachment point of the secondary harness (4) on the main harness (3) is substantially equal to the distance D2 between the frontal end (12) and said attachment point.

17. Equipment according to claim 1, wherein the spacer element (5) has a concave lower face.

* * * * *